(12) United States Patent
Tu et al.

(10) Patent No.: US 8,730,541 B2
(45) Date of Patent: May 20, 2014

(54) DUPLEX SCANNING APPARATUS

(75) Inventors: Tung-Wen Tu, Taipei (TW); Yan-Hua Li, Taipei (TW)

(73) Assignee: Primax Electronics Ltd., Taipei (TW)

( * ) Notice: Subject to any disclaimer, the term of this patent is extended or adjusted under 35 U.S.C. 154(b) by 68 days.

(21) Appl. No.: 13/554,856

(22) Filed: Jul. 20, 2012

(65) Prior Publication Data

US 2013/0182298 A1 Jul. 18, 2013

Related U.S. Application Data

(60) Provisional application No. 61/586,306, filed on Jan. 13, 2012.

(51) Int. Cl.
*H04N 1/04* (2006.01)
*H04N 1/393* (2006.01)
*H04N 1/40* (2006.01)
*G03B 27/32* (2006.01)

(52) U.S. Cl.
USPC ........... 358/498; 358/451; 358/474; 358/461; 355/24

(58) Field of Classification Search
USPC ...................... 358/498, 451, 474, 461; 355/24
See application file for complete search history.

(56) References Cited

U.S. PATENT DOCUMENTS

2008/0304116 A1* 12/2008 Lee ............................... 358/498

* cited by examiner

*Primary Examiner* — Charlotte M Baker
*Assistant Examiner* — Rury Grisham
(74) *Attorney, Agent, or Firm* — Kirton McConkie; Evan R. Witt

(57) ABSTRACT

A duplex scanning apparatus includes a flatbed scanning portion and an automatic document feeder. The flatbed scanning portion has a first scanning module. The automatic document feeder has a second scanning module. The first scanning module has a first normal line perpendicular to a horizontal plane. The second scanning module is disposed in an inclined channel, and has a second normal line. In addition, an included angle is defined between the first normal line and the second normal line. Since the second scanning module is not directly disposed over the first scanning module, the height of the duplex scanning apparatus is reduced.

6 Claims, 3 Drawing Sheets

DUPLEX SCANNING APPARATUS

CROSS-REFERENCE TO RELATED APPLICATION

This application claims priority to U.S. Provisional Patent Application No. 61/586,306 entitled "DUPLEX SCANNING APPARATUS" filed Jan. 13, 2012, the contents of which are incorporated herein by reference.

FIELD OF THE INVENTION

The present invention relates to a scanning apparatus, and more particularly to a duplex scanning apparatus for scanning both sides of a document.

BACKGROUND OF THE INVENTION

With increasing development of scientific technologies, the method for storing documents is changed from the filing of sheet documents to the storage of the documents' electronic files. Generally, a scanning apparatus is a device for scanning the contents of sheet documents into electronic files, which are then stored, processed or spread.

In the early stage, the scanning apparatus can only scan one side of the document. For scanning both sides of the document, after one side of the document has been scanned, the document should be manually turned over so as to scan the other side of the document. However, the process of manually turning over the document is troublesome. For solving the drawbacks, an automatic document feeder is usually integrated into a flatbed scanning apparatus. Consequently, a stack of documents can be successively transported by the automatic document feeder and the duplex scanning operation can be performed by the flatbed scanning apparatus the without the need of manually turning over the documents.

Conventionally, the automatic document feeder and the flatbed scanning apparatus are integrated as a duplex scanning apparatus. This duplex scanning apparatus has a single scanning module for scanning both sides of the document. Since there is only one scanning module, a special mechanism is required to turn over the document after one side of the document has been scanned.

The configurations and operating principles of the conventional duplex scanning apparatus will be illustrated as follows. FIG. 1 is a schematic side view illustrating a conventional duplex scanning apparatus. As shown in FIG. 1, the conventional duplex scanning apparatus 1 comprises a flatbed scanning portion 10 and an automatic document feeder 11. The flatbed scanning portion 10 has a scanning module 101. The automatic document feeder 11 is disposed over the flatbed scanning portion 10. The automatic document feeder 11 comprises a sheet input tray 111, a sheet ejecting tray 112, a sheet pick-up module 113, a sheet transfer channel 114, an inverting region 115, a scanning region 116, plural transfer roller assemblies 117, an inverting channel 118, and a sheet ejecting roller assembly 119.

The process of performing a duplex scanning operation by the conventional duplex scanning apparatus 1 will be illustrated as follows. Firstly, plural documents S are placed on the sheet input tray 111, wherein the first sides of the documents S face upwardly. Then, the sheet pick-up module 113 is contacted with the uppermost document S of the plural documents S to feed the uppermost document S into the sheet transfer channel 114. Then, the document S is transported across a bent zone 1141 of the sheet transfer channel 114 by the transfer roller assemblies 117, so that the first side of the document S faces downwardly. Then, the document S whose first side faces downwardly is moved to the scanning region 116 by the transfer roller assemblies 117. Consequently, the first side of the document S is scanned by the scanning module 101, which is disposed under the scanning region 116. After the first side of the document S has been scanned, the document S is moved to the inverting region 115 by the transfer roller assemblies 117 and the sheet ejecting roller assembly 119. Then, the document S is transported into the inverting channel 118 by the sheet ejecting roller assembly 119 and moved toward the scanning region 116. Consequently, the document S is inverted, and the second side of the document S faces downwardly. Then, the document S whose second side faces downwardly is moved to the scanning region 116 again. Consequently, the second side of the document S is scanned by the scanning module 101.

After the double sides of the document S have been completely scanned, the document S should be inverted again in order to rearrange the scanned document S to be in the same order as the original stack. For rearranging the scanned document S to be in the same order as the original stack, the document S is moved to the inverting region 115 again by transfer roller assemblies 117 and the sheet ejecting roller assembly 119, and the document S is transported into the inverting region 118 by the sheet ejecting roller assembly 119. Consequently, the document S is inverted, and the first side of the document S faces downwardly. Then, the document S is transported across the scanning region 116. At this moment, the first side of the document S is not scanned by the scanning module 101. After the document S is moved to the sheet ejecting tray 112 by the sheet ejecting roller assembly 119 and the first side of the document S faces downwardly, the duplex scanning operation of the document S is completed. The processes of duplex scanning the remaining documents S on the sheet input tray 111 are similar to the process of duplex scanning the first document S, and are not redundantly described herein. After the plural documents S have been scanned, the plural scanned documents S are placed on the sheet ejecting tray 112 in the same order as the original stack, wherein the first sides of the plural documents S face downwardly.

From the above discussions, the document should be transported across the scanning region for three times during the duplex scanning operation is performed by the conventional duplex scanning apparatus 1. Therefore, such a duplex scanning operation is referred as a three-pass scanning operation. The three-pass scanning operation of the conventional duplex scanning apparatus 1, however, is relatively time-consuming. For increasing the scanning speed and the scanning efficiency of the duplex scanning apparatus, another conventional duplex scanning apparatus has been disclosed.

FIG. 2 is a schematic side view illustrating another conventional duplex scanning apparatus. As shown in FIG. 2, the conventional duplex scanning apparatus comprises a flatbed scanning portion 20 and an automatic document feeder 21. The flatbed scanning portion 20 has a first scanning module 201. The automatic document feeder 21 is disposed over the flatbed scanning portion 20. The automatic document feeder 21 comprises a sheet input tray 211, a sheet ejecting tray 212, a sheet pick-up module 213, a sheet transfer channel 214, a scanning region 215, a second scanning module 216, plural transfer roller assemblies 217, and a sheet ejecting roller assembly 218.

The sheet input tray 211 is used for placing plural documents S' thereon. After the documents S' are scanned, the scanned documents S' are placed on the sheet ejecting tray 212. The sheet pick-up module 213 is located beside the sheet input tray 211. When the sheet pick-up module 213 is contacted with the plural documents S' on the sheet input tray 211, the plural documents S' can be successively fed into the sheet transfer channel 214. The sheet transfer channel 214 is disposed within the automatic document feeder 21, and arranged between the sheet input tray 211 and the sheet ejecting tray 212. The sheet transfer channel 214 passes through the sheet pick-up module 213 and the scanning region 215. The scanning region 215 is disposed over the first scanning module 201. When the document S' is transported across the scanning region 215, the first side of the document S' is scanned by the first scanning module 201. The second scanning module 216 is disposed over the scanning region 215. When the document S' is transported across the scanning region 215, the second side of the document S' is scanned by the second scanning module 216. The plural transfer roller assemblies 217 are disposed in the sheet transfer channel 214 for transferring the plural documents S' through the sheet transfer channel 214 and transporting the plural documents S' across the scanning region 215. The sheet ejecting roller assembly 218 is located beside the sheet ejecting tray 212 for transporting the scanning documents S' to the sheet ejecting tray 212.

The process of performing a duplex scanning operation by this conventional duplex scanning apparatus 2 will be illustrated as follows. Firstly, plural documents S' are placed on the sheet input tray 211, wherein the first sides of the documents S' face downwardly. Then, the sheet pick-up module 213 is contacted with the uppermost document S' of the plural documents S' to feed the uppermost document S' into the sheet transfer channel 214. Then, the document S' is moved to the scanning region 215 by the transfer roller assemblies 217, wherein the first side of the document S' faces downwardly. When the document S' is transported across the scanning region 215, the first side of the document S' is scanned by the first scanning module 201 under the scanning region 215 and the second side of the document S' is scanned by the second scanning module 216 over the scanning region 215. Then, the document S' is moved to the sheet ejecting tray 212 by the transfer roller assemblies 217 and the sheet ejecting roller assembly 218, wherein the first side of the document S' still faces downwardly. Meanwhile, the duplex scanning operation of the document S' is completed. The processes of duplex scanning the remaining documents S' on the sheet input tray 211 are similar to the process of duplex scanning the first document S', and are not redundantly described herein.

Since the document is only transported across the scanning region once during the duplex scanning operation is performed by the conventional duplex scanning apparatus 2, the duplex scanning operation is also referred as a one-pass scanning operation. The conventional duplex scanning apparatus 2 has reduced working time. However, this conventional duplex scanning apparatus 2 is more expensive. In addition, since the second scanning module 216 is installed in the automatic document feeder 21, the height and the overall volume of this conventional duplex scanning apparatus 2 are both increased.

SUMMARY OF THE INVENTION

The present invention provides a duplex scanning apparatus with reduced volume.

In accordance with an aspect of the present invention, there is provided a duplex scanning apparatus for scanning a first side and a second side of at least one document. The duplex scanning apparatus includes a flatbed scanning portion and an automatic document feeder. The flatbed scanning portion has a first scanning module for scanning the first side of the at least one document. The first scanning module has a first normal line perpendicular to a horizontal plane. The automatic document feeder is disposed over the flatbed scanning portion for transporting the at least one document and scanning the second side of the at least one document. Moreover, the automatic document feeder includes a sheet transfer channel and a second scanning module. The sheet transfer channel is disposed within the automatic document feeder for allowing the at least one document to go through, wherein the sheet transfer channel has a channel entrance. The second scanning module is disposed in the sheet transfer channel and located near the channel entrance for scanning the second side of the at least one document. The second scanning module has a second normal line. In addition, an included angle is defined between the first normal line and the second normal line.

In an embodiment, the automatic document feeder further includes a sheet input tray, a sheet ejecting tray, a sheet pick-up module, a first scanning region, a second scanning region, and plural roller assemblies. The sheet input tray is located near the channel entrance for placing the at least one document thereon. The sheet ejecting tray is disposed under the sheet input tray and near a channel exit of the sheet transfer channel. After the at least one document has been scanned, the scanned document is placed on the sheet ejecting tray. The sheet pick-up module is located beside the sheet input tray and near the channel entrance for transporting the at least one document into the sheet transfer channel through the channel entrance. The first scanning region is disposed over the first scanning module of the flatbed scanning portion. The second scanning region is disposed over the second scanning module. The plural roller assemblies are disposed in the sheet transfer channel for transporting the at least one document to the first scanning region, the second scanning region or the sheet ejecting tray.

In an embodiment, the sheet pick-up module includes a sheet pick-up roller and a sheet separation roller. The sheet pick-up roller is used for contacting with the at least one document on the sheet input tray, thereby transporting the at least one document into the sheet transfer channel through the channel entrance. The sheet separation roller is disposed beside the sheet pick-up roller and synchronously rotated with the sheet pick-up roller for separating the at least one document, thereby feeding a single document into the sheet transfer channel at a time.

In an embodiment, the plural roller assemblies include a transfer roller assembly and a shared roller assembly. The transfer roller assembly is disposed in a bent segment of the sheet transfer channel for transporting the at least one document to the first scanning region. The shared roller assembly is disposed beside the channel entrance and the channel exit for transporting the at least one document from the channel entrance to the second scanning region or transporting the at least one document from the first scanning region to the sheet ejecting tray.

In an embodiment, the bent segment is arranged between the first scanning region and the second scanning region.

In an embodiment, the shared roller assembly includes a shared roller, a first sustaining roller, and a second sustaining roller. The shared roller is arranged between the channel entrance and the channel exit. Upon rotation of the shared roller, the at least one document is transported to the second scanning region or the sheet ejecting tray. The first sustaining roller is located beside the channel entrance for exerting a first pushing force on the at least one document. In response to the first pushing force, the at least one document is nipped between the shared roller and the first sustaining roller, and the at least one document is transported to the second scanning region by the shared roller. The second sustaining roller is located beside the channel exit for exerting a second pushing force on the at least one document. In response to the second pushing force, the at least one document is nipped between the shared roller and the second sustaining roller, and the at least one document is transported to the sheet ejecting tray by the shared roller.

In an embodiment, the transfer roller assembly includes a driving roller, and idler roller, and a third sustaining roller. The driving roller is used for transporting the at least one document. The idler roller is located beside the driving roller. Upon rotation of the driving roller, the idler roller is driven to be rotated to assist in transporting the at least one document, so that the at least one document is moved through a region between the driving roller and the idler roller. The third sustaining roller is used for exerting a third pushing force on the at least one document. In response to the third pushing force, the at least one document is nipped between the driving roller and the third sustaining roller. Upon rotation of the driving roller, the at least one document is transported to the first scanning region.

In an embodiment, the sheet transfer channel further includes an inclined segment, which is arranged between the channel entrance and the transfer roller assembly. The inclined segment is inclined relative to the horizontal plane, and the second scanning module is disposed in the inclined segment, so that the included angle is defined between the first normal line of the first scanning module and the second normal line of the second scanning module.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
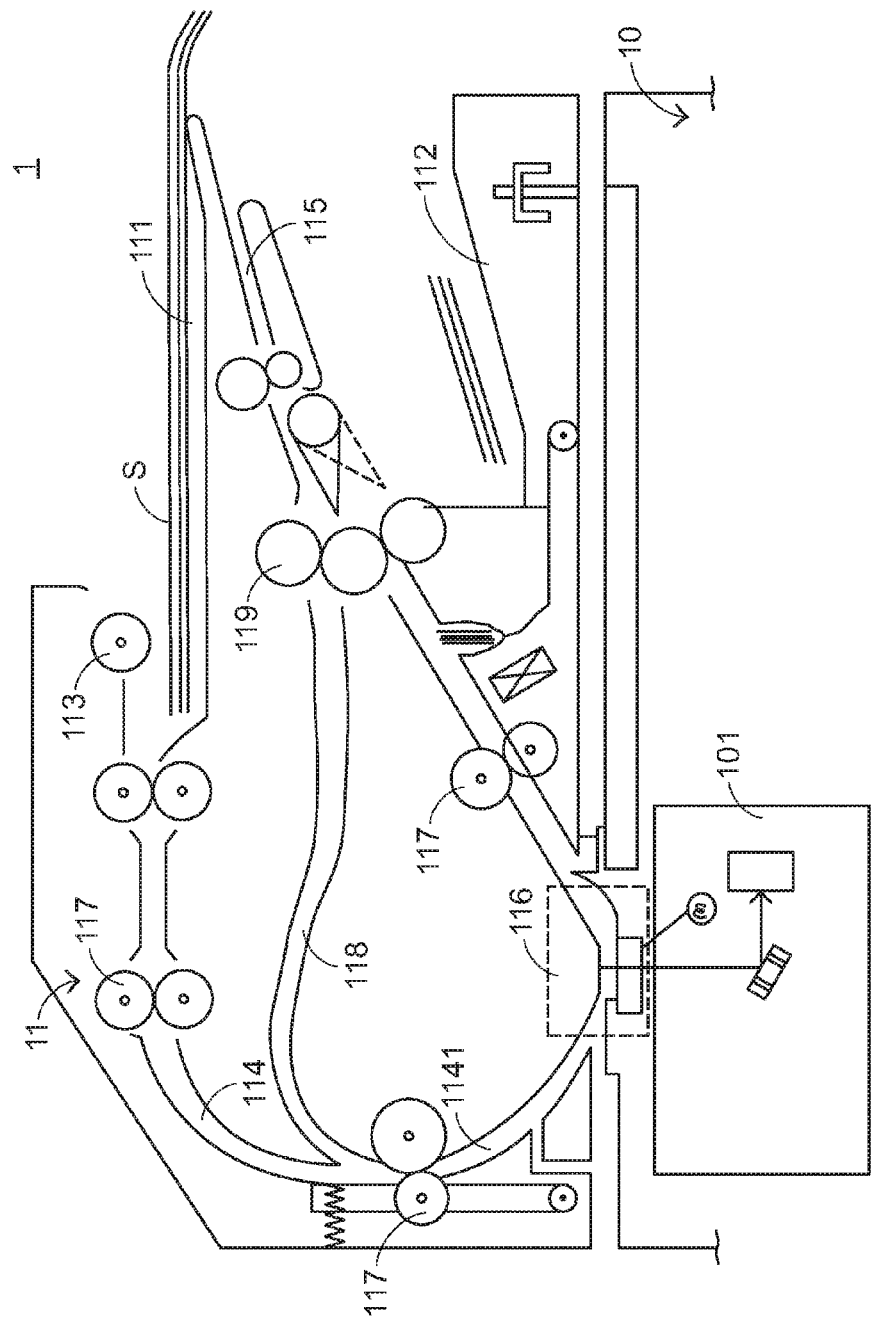
FIG. 1 is a schematic side view illustrating a conventional duplex scanning apparatus.
Figure 2:
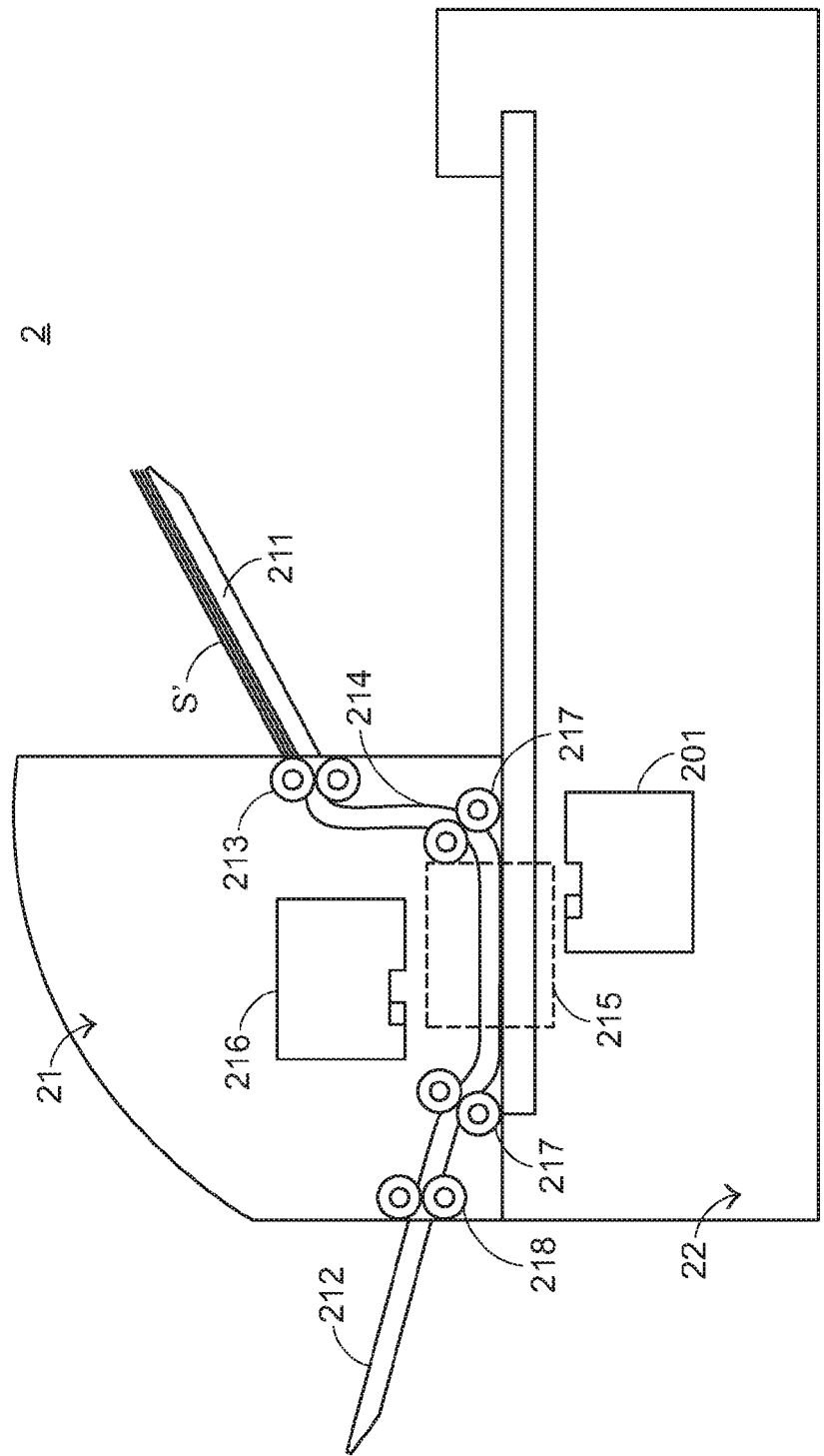
FIG. 2 is a schematic side view illustrating another conventional duplex scanning apparatus.
Figure 3:
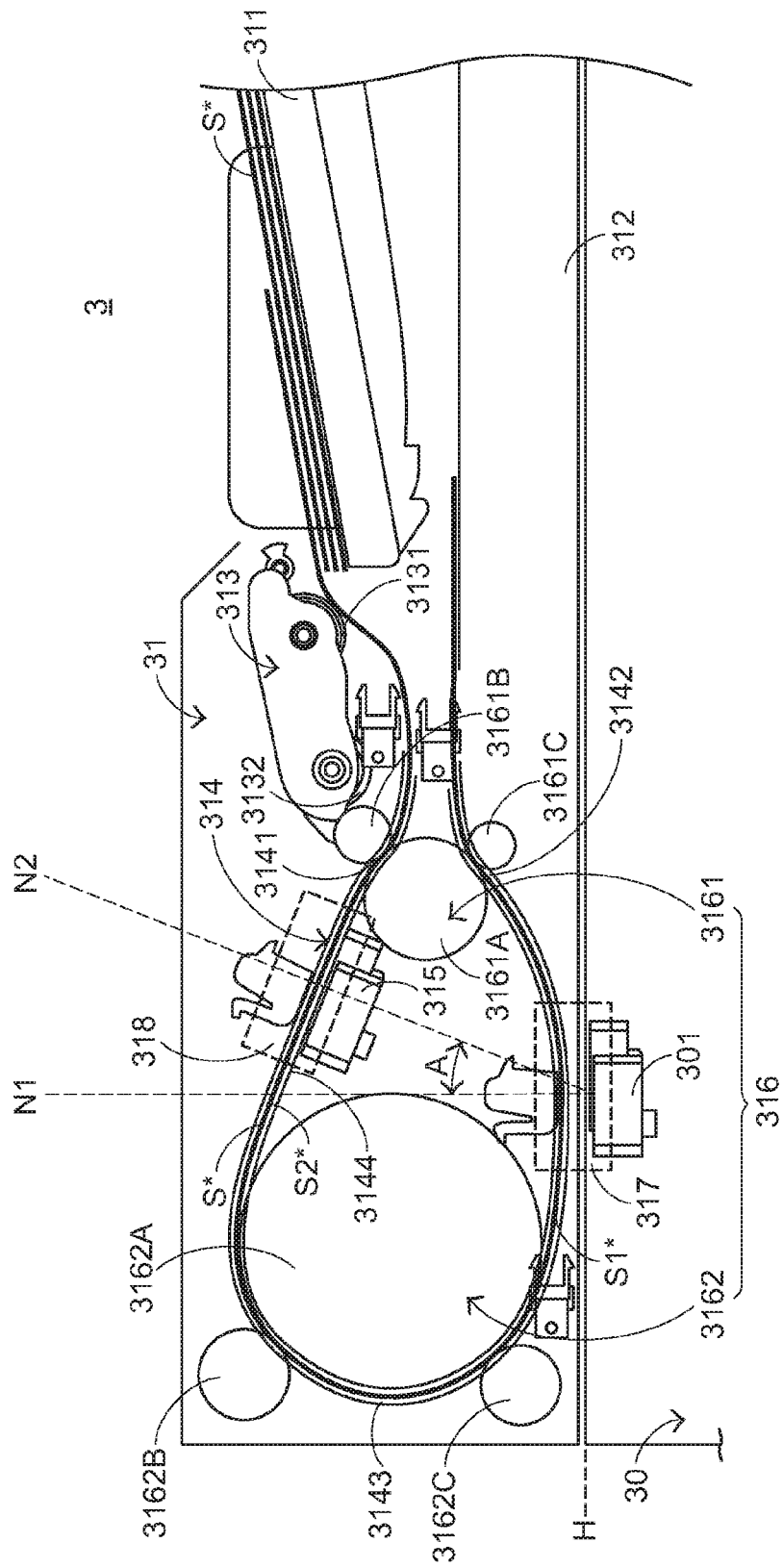
FIG. 3 is a schematic side view illustrating a duplex scanning apparatus according to an embodiment of the present invention.

For eliminating the drawbacks encountered from the prior art, the present invention provides a duplex scanning apparatus. FIG. 3 is a schematic side view illustrating a duplex scanning apparatus according to an embodiment of the present invention. As shown in FIG. 3, the duplex scanning apparatus 3 comprises a flatbed scanning portion 30 and an automatic document feeder 31. The flatbed scanning portion 30 has a first scanning module 301 for scanning a first side S1* of at least one document S*. The first scanning module 301 has a first normal line N1, which is perpendicular to a horizontal plane H. The automatic document feeder 31 is disposed over the flatbed scanning portion 30 for feeding the at least one document S*. The automatic document feeder 31 comprises a sheet input tray 311, a sheet ejecting tray 312, a sheet pick-up module 313, a sheet transfer channel 314, a second scanning module 315, plural roller assemblies 316, a first scanning region 317, and a second scanning region 318. The sheet transfer channel 314 is disposed within the automatic document feeder 31. In addition, the sheet transfer channel 314 comprises a channel entrance 3141, a channel exit 3142, a bent segment 3143, and an inclined segment 3144. The sheet input tray 311 is located beside the channel entrance 3141. In addition, the sheet input tray 311 is used for placing the at least one document S* thereon. The sheet ejecting tray 312 is disposed under the sheet input tray 311, and located near the channel exit 3142. After the at least one document S* is scanned, the at least one scanned document S* is placed on the sheet ejecting tray 312.

The sheet pick-up module 313 is located beside the sheet input tray 311 and near the channel entrance 3141. The sheet pick-up module 313 is used for transporting the at least one document S* into the sheet transfer channel 314 through the channel entrance 3141. The sheet pick-up module 313 comprises a sheet pick-up roller 3131 and a sheet separation roller 3132. When the sheet pick-up roller 3131 is contacted with the at least one document S* on the sheet input tray 311, the at least one document S* may be fed into the sheet transfer channel 314 through the channel entrance 3141. The sheet separation roller 3132 is used for separating the document S* from the underlying documents S*, so that only a single document S* is fed into the sheet transfer channel 314 at a time. The second scanning module 315 is disposed in the inclined segment 3144 of the sheet transfer channel 314 and located near the channel entrance 3141. The second scanning module 315 is used for scanning a second side S2* of the at least one document S*. In addition, the second scanning module 315 has a second normal line N2. In this embodiment, there is an included angle A between the first normal line N1 and the second normal line N2.

Please refer to FIG. 3 again. The first scanning region 317 is disposed over the first scanning module 301 of the flatbed scanning portion 30. The second scanning region 318 is disposed over the second scanning module 315. The bent segment 3143 of the sheet transfer channel 314 is arranged between the first scanning region 317 and the second scanning region 318. The plural roller assemblies 316 are disposed in the sheet transfer channel 314. The plural roller assemblies 316 are used for transporting at least one document S* to the first scanning region 317, the second scanning region 318 or the sheet ejecting tray 312. The plural roller assemblies 316 comprise a shared roller assembly 3161 and a transfer roller assembly 3162. The shared roller assembly 3161 is arranged between the channel entrance 3141 and the channel exit 3142 for transporting the document S* from the channel entrance 3141 to the second scanning region 318 or transporting the document S* from the first scanning region 317 to the sheet ejecting tray 312. In addition, the shared roller assembly 3161 comprises a shared roller 3161A, a first sustaining roller 3161B, and a second sustaining roller 3161C. The shared roller 3161A and the first sustaining roller 3161B are located at two opposite sides of the channel entrance 3141, respectively. The first sustaining roller 3161B is located beside the channel entrance 3141 for exerting a first pushing force on the document S*. In response to the first pushing force exerted on the document S*, the document S* is nipped between the shared roller 3161A and the first sustaining roller 3161B. Consequently, upon rotation of the shared roller 3161A, the document S* is transported to the second scanning region 318. The shared roller 3161A is arranged between the channel entrance 3141 and the channel exit 3142. The second sustaining roller 3161C is located beside the channel exit 3142. Like the first sustaining roller 3161B, the second sustaining roller 3161C may exert a second pushing force on the document S*. Similarly, in response to the second pushing force, the document S* is nipped between the shared roller 3161A and the second sustaining 3161C. Consequently, upon rotation of the shared roller 3161A, the document S* is transported to the sheet ejecting tray 312.

The transfer roller assembly 3162 is located in the bent segment 3143 of the sheet transfer channel 314, and arranged between the first scanning region 317 and the second scanning region 318. The transfer roller assembly 3162 is used for transporting the document S* from the second scanning region 318 to the first scanning region 317 through the bent segment 3143 of the sheet transfer channel 314. In addition, the transfer roller assembly 3162 comprises a driving roller 3162A, an idler roller 3162B, and a third sustaining roller 3613C. The driving roller 3162A is rotated to transport the document S*. The idler roller 3162B is located beside the driving roller 3162A. Upon rotation of the driving roller 3162A, the idler roller 3162B is driven to be rotated to assist in transporting the document S*. Consequently, the document S* is moved through the region between the driving roller 3162A and the idler roller 3162B. The third sustaining roller 3613C is used for exerting a third pushing force on the document S*. In response to the third pushing force, the document S* is nipped between the driving roller 3162A and the third sustaining roller 3162C. Consequently, upon rotation of the driving roller 3162A, the document S* is transported to the first scanning region 317.

In this embodiment, the inclined segment 3144 of the sheet transfer channel 314 is the segment from the channel entrance 3141 to the transfer roller assembly 3162. In addition, the inclined segment 3144 is an inclined channel that is inclined relative to the horizontal plane H. The second scanning module 315 is disposed in the inclined segment 3144, and located under the second scanning region 318 for scanning a second side S2* of the document S*. In this embodiment, the line normal to the second scanning module 315 and the inclined segment 3144 is defined as the second normal line N2. Since the inclined segment 3144 is inclined relative to the horizontal plane H, an included angle is defined between the inclined segment 3144 and the horizontal plane H. As shown in FIG. 3, there is an included angle A between the first normal line N1 and the second normal line N2.

Hereinafter, the process of performing a duplex scanning operation by the duplex scanning apparatus 3 of the present invention will be illustrated with reference to FIG. 3. Firstly, plural documents S* are placed on the sheet input tray 311, wherein the first sides S1* of the documents S* face upwardly. Then, the sheet pick-up module 313 is contacted with the uppermost document S* of the plural documents S* to feed the uppermost document S* into the channel entrance 3141 of the sheet transfer channel 314. When the document S* is moved to the channel entrance 3141, a first pushing force is exerted on the document S* by the first sustaining roller 3161B of the shared roller assembly 3161, so that the document S* is nipped between the shared roller 3161A and the first sustaining roller 3161B. Under this circumstance, the document S* can be smoothly transported by the shared roller 3161A to the second scanning region 318, which is disposed in the inclined segment 3144 of the sheet transfer channel 314.

After the document S* is moved to the second scanning region 318, the second side S2* of the document S* faces downwardly toward the second scanning module 315. Then, the second side S2* of the document S* is scanned by the second scanning module 318 under the second scanning region 318, so that a second side image of the document S* is acquired. After the second side S2* of the document S* has been scanned, the document S* is transported to the first scanning region 317 by the transfer roller assembly 3162 through the bent segment 3143 of the sheet transfer channel 314. In response to a third pushing force exerted on the document S* by the third sustaining roller 3162C of the transfer roller assembly 3162, the document S* is nipped between the driving roller 3162A and the third sustaining roller 3162C. Consequently, the document S* can be smoothly transported to the first scanning region 317. After the document S* is moved through the bent segment 3143, the document S* is inverted and thus the first side S1* of the document S* faces downwardly. When the document S* is moved through the first scanning region 317, the first side S1* of the document S* faces the first scanning module 301. The first side S1* of the document S* is scanned by the first scanning module 301 under the first scanning region 317, so that a first side image of the document S* is acquired.

Then, in response to a second pushing force exerted on the document S* by the second sustaining roller 3161C of the shared roller assembly 3161, the document S* is nipped between the shared roller 3161A and the second sustaining roller 3161C. Consequently, the document S* is transported to the sheet ejecting tray 312, wherein the first side S1* of the document S* still faces downwardly. Meanwhile, the duplex scanning operation of the document* is completed. The processes of duplex scanning the remaining documents S* on the sheet input tray 311 are similar to the process of duplex scanning the first document S*, and are not redundantly described herein. After the plural documents S* have been scanned, the plural scanned documents S* are placed on the sheet ejecting tray 312 in the same order as the original stack, wherein the first sides S1* of the plural documents S* face downwardly.

From the above description, the duplex scanning apparatus of the present invention comprises a first scanning module and a second scanning module. The duplex scanning operation performed by the duplex scanning apparatus of the present invention is a one-pass scanning operation. The second scanning module is not directly disposed over the first scanning module. In particular, the second scanning module is accommodated within the unavailable space under the inclined segment of the sheet transfer channel. As a consequence, the duplex scanning apparatus of the present invention has reduced height and reduced overall volume. Moreover, since at least one transfer roller assembly and the sheet ejecting roller assembly used in the conventional duplex scanning apparatus are replaced by the shared roller assembly, the duplex scanning apparatus of the present invention needs less number of rollers. In such way, the space utilization is enhanced. In addition to the reduced volume, the duplex scanning apparatus of the present invention is cost-effective because of the less number of rollers.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A duplex scanning apparatus for scanning a first side and a second side of at least one document, said duplex scanning apparatus comprising:

a flatbed scanning portion having a first scanning module for scanning said first side of said at least one document, wherein said first scanning module has a first normal line perpendicular to a horizontal plane; and an automatic document feeder disposed over said flatbed scanning portion for transporting said at least one document and scanning said second side of said at least one document, wherein said automatic document feeder comprises:
- a sheet transfer channel disposed within said automatic document feeder for allowing said at least one document to go through, wherein said sheet transfer channel has a channel entrance;
- a second scanning module disposed in said sheet transfer channel and located near said channel entrance for scanning said second side of said at least one document, wherein said second scanning module has a second normal line, and an included angle is defined between said first normal line and said second normal line;
- a sheet input tray located near said channel entrance for placing said at least one document thereon;
- a sheet ejecting tray disposed under said sheet input tray and near a channel exit of said sheet transfer channel, wherein after said at least one document has been scanned, said scanned document is placed on said sheet ejecting tray;
- a sheet pick-up module located beside said sheet input tray and near said channel entrance for transporting said at least one document into said sheet transfer channel through said channel entrance;
- a first scanning region disposed over said first scanning module of said flatbed scanning portion;
- a second scanning region disposed over said second scanning module; and
- plural roller assemblies disposed in said sheet transfer channel for transporting said at least one document to said first scanning region, said second scanning region or said sheet ejecting tray, wherein said plural roller assemblies comprise:
  - a transfer roller assembly disposed in a bent segment of said sheet transfer channel for transporting said at least one document to said first scanning region; and
  - a shared roller assembly disposed beside said channel entrance and said channel exit for transporting said at least one document from said channel entrance to said second scanning region or transporting said at least one document from said first scanning region to said sheet ejecting tray.

2. The duplex scanning apparatus according to claim 1, wherein said transfer roller assembly comprises:
- a driving roller for transporting said at least one document;
- an idler roller located beside said driving roller, wherein upon rotation of said driving roller, said idler roller is driven to be rotated to assist in transporting said at least one document, so that said at least one document is moved through a region between said driving roller and said idler roller; and
- a third sustaining roller for exerting a third pushing force on said at least one document, wherein in response to said third pushing force, said at least one document is nipped between said driving roller and said third sustaining roller, wherein upon rotation of said driving roller, said at least one document is transported to the first scanning region.

3. The duplex scanning apparatus according to claim 1, wherein said sheet pick-up module comprises:
- a sheet pick-up roller for contacting with said at least one document on said sheet input tray, thereby transporting said at least one document into said sheet transfer channel through said channel entrance; and
- a sheet separation roller disposed beside said sheet pick-up roller and synchronously rotated with said sheet pick-up roller for separating said at least one document, thereby feeding a single document into said sheet transfer channel at a time.

4. The duplex scanning apparatus according to claim 1, wherein said sheet transfer channel further comprises an inclined segment, which is arranged between said channel entrance and said transfer roller assembly, wherein said inclined segment is inclined relative to said horizontal plane, and said second scanning module is disposed in said inclined segment, so that said included angle is defined between said first normal line of said first scanning module and said second normal line of said second scanning module.

5. The duplex scanning apparatus according to claim 1, wherein said bent segment is arranged between said first scanning region and said second scanning region.

6. The duplex scanning apparatus according to claim 1, wherein said shared roller assembly comprises:
- a shared roller arranged between said channel entrance and said channel exit, wherein upon rotation of said shared roller, said at least one document is transported to said second scanning region or said sheet ejecting tray;
- a first sustaining roller located beside said channel entrance for exerting a first pushing force on said at least one document, wherein in response to said first pushing force, said at least one document is nipped between said shared roller and said first sustaining roller, and said at least one document is transported to said second scanning region by said shared roller; and
- a second sustaining roller located beside said channel exit for exerting a second pushing force on said at least one document, wherein in response to said second pushing force, said at least one document is nipped between said shared roller and said second sustaining roller, and said at least one document is transported to said sheet ejecting tray by said shared roller.

* * * * *